United States Patent
Tan et al.

(10) Patent No.: US 12,054,362 B2
(45) Date of Patent: Aug. 6, 2024

(54) CRANE COUNTERWEIGHT BLOCK ALIGNMENT DETECTION AND CONTROL METHOD AND DEVICE, AND CRANE

(71) Applicant: ZOOMLION HEAVY INDUSTRY SCIENCE AND TECHNOLOGY CO., LTD., Changsha (CN)

(72) Inventors: Zhiren Tan, Changsha (CN); Qing Fan, Changsha (CN); Ling Fu, Changsha (CN); Yanbin Liu, Changsha (CN); Yang Zeng, Changsha (CN); Baike Xu, Changsha (CN); Hong Wu, Changsha (CN); Jimei Guo, Changsha (CN); Zan Huang, Changsha (CN)

(73) Assignee: ZOOMLION HEAVY INDUSTRY SCIENCE AND TECHNOLOGY CO., LTD., Changsha (CN)

( * ) Notice: Subject to any disclaimer, the term of this patent is extended or adjusted under 35 U.S.C. 154(b) by 373 days.

(21) Appl. No.: 17/624,780

(22) PCT Filed: Jul. 3, 2020

(86) PCT No.: PCT/CN2020/100159
§ 371 (c)(1),
(2) Date: Jan. 4, 2022

(87) PCT Pub. No.: WO2021/000942
PCT Pub. Date: Jan. 7, 2021

(65) Prior Publication Data
US 2022/0259016 A1    Aug. 18, 2022

(30) Foreign Application Priority Data
Jul. 4, 2019   (CN) .......................... 201910598050.7

(51) Int. Cl.
*B66C 23/74* (2006.01)
*B66C 13/08* (2006.01)
(Continued)

(52) U.S. Cl.
CPC ............ *B66C 13/46* (2013.01); *B66C 13/085* (2013.01); *B66C 13/18* (2013.01); *B66C 23/74* (2013.01);
(Continued)

(58) Field of Classification Search
CPC ......... B66C 23/72; B66C 23/74; B66C 23/76; E02F 9/18; B62D 49/085
See application file for complete search history.

(56) References Cited

U.S. PATENT DOCUMENTS 10,189,683 B2 *  1/2019  Bitz ........................ B66C 23/76
10,870,561 B2 * 12/2020  Bitz ........................ B66C 23/76
(Continued)

FOREIGN PATENT DOCUMENTS

CN        201882831 U     6/2011
CN        202226577 U     5/2012
(Continued)

*Primary Examiner* — Michael R Mansen
*Assistant Examiner* — Juan J Campos, Jr.
(74) *Attorney, Agent, or Firm* — Volpe Koenig

(57) ABSTRACT

A crane counterweight block alignment detection and control method, a crane counterweight block alignment detection and control device, and a crane. The crane counterweight block alignment detection and control method comprise: a counterweight block being provided with mounting holes for matching with positioning pins on a crane, detecting the center position of the counterweight block, and calculating the relative offset between the center position and the position of the positioning pins; detecting the relative positions of the mounting holes in the counterweight block and the positioning pins, and calculating,
(Continued)

according to the positions, a relative rotation angle of the counterweight block for aligning the mounting holes with the positioning pins; and controlling, according to the relative offset and relative rotation angle, the movement of the counterweight block to enable the mounting holes in the counterweight block to be aligned with and installed onto the positioning pins.

18 Claims, 6 Drawing Sheets

(51) Int. Cl.
  *B66C 13/18* (2006.01)
  *B66C 13/46* (2006.01)
  *G06T 7/168* (2017.01)
  *G06T 7/194* (2017.01)
  *G06T 7/73* (2017.01)
(52) U.S. Cl.
  CPC .............. *G06T 7/168* (2017.01); *G06T 7/194* (2017.01); *G06T 7/74* (2017.01); *G06T 2207/20061* (2013.01); *G06T 2207/20064* (2013.01)

(56) References Cited

U.S. PATENT DOCUMENTS

| | | | |
|---|---|---|---|
| 11,124,392 B2* | 9/2021 | Rudy | B66C 13/46 |
| 2016/0185576 A1* | 6/2016 | Bitz | B66C 23/76 |
| | | | 212/197 |
| 2016/0289047 A1 | 10/2016 | Albinger et al. | |
| 2018/0143011 A1* | 5/2018 | Rudy | B66C 23/76 |
| 2019/0194000 A1* | 6/2019 | Bitz | B66C 23/76 |

FOREIGN PATENT DOCUMENTS

| | | |
|---|---|---|
| CN | 102817958 A | 12/2012 |
| CN | 104612202 A | 5/2015 |
| CN | 106044591 A | 10/2016 |
| CN | 109231034 A | 1/2019 |
| CN | 110956181 A | 4/2020 |
| JP | 2014101191 A | 6/2015 |
| JP | 2017043430 A | 3/2017 |
| JP | 2018203434 A | 12/2018 |

* cited by examiner

CRANE COUNTERWEIGHT BLOCK ALIGNMENT DETECTION AND CONTROL METHOD AND DEVICE, AND CRANE

CROSS REFERENCE TO RELATED APPLICATIONS

This application is a 35 USC § 371 National Stage application of International Patent Application No. PCT/CN2020/100159, which was filed Jul. 3, 2020, entitled "CRANE COUNTERWEIGHT BLOCK ALIGNMENT DETECTION AND CONTROL METHOD AND DEVICE, AND CRANE" and claims priority to Chinese Patent Application No. 201910598050.7, filed Jul. 4, 2019 which is incorporated herein by reference as if fully set forth.

FIELD OF THE INVENTION

The present invention relates to the field of engineering machinery, and in particular, to a crane counterweight block alignment detection and control method and device, and a crane.

BACKGROUND OF THE INVENTION

Mounting of the crane counterweight block is one of the very important links in a large crane hoisting system. The crane counterweight block is used to maintain the balance of a vehicle in the hoisting process of the crane. At present, the counterweight block alignment process of the crane is mainly implemented by manual operation, which leads to low efficiency of the whole construction process, potential safety hazards and liability to safety accidents.

Chinese invention patent application CN 106064794A published on Nov. 2, 2016 discloses "Crane-based balance weight support, and intelligent control system of crane-based balance weight support and self-elevating method of intelligent control system". When the balance weight support is applied, the balance weight support can be automatically hoisted to the side face of a crawler belt frame of a vehicle located below through a crane, then, after a balance weight needing to be mounted is hoisted onto the support, self-elevating is conducted on the balance weight; and after the balance weight is elevated to be in place through a balance weight elevating oil cylinder, a site installation worker can stand on the balance weight support through a ladder on the side face of the balance weight support, and the work of fixing the balance weight to the tail of a rotary table through plug pins is completed. However, the balance weight mounting process still requires human intervention, and the balance weight block needing to be mounted is manually hoisted to the support, so that the function of automatically aligning the balance weight block to the specified position is not fundamentally solved.

Chinese utility model patent CN 201952114U issued on Aug. 31, 2011 discloses "Intelligent crane with visual crane positioning system". An image is acquired by a CCD camera, the acquired image analog signal is transformed into a digital signal by an image acquisition card to be input to a computer, and then a cylindrical target is rapidly recognized and positioned by an image analysis algorithm. However, the technical solution disclosed by the utility model patent only recognizes and positions the cylindrical target, the positioning object is single, and the recognition and positioning situation of the irregular object (such as the counterweight block) is not considered.

In summary, the art needs a method and device capable of realizing automatic alignment detection and control mounting of the crane counterweight block.

SUMMARY OF THE INVENTION

The present invention patent provides a crane counterweight block alignment detection and control method and device, and a crane. The position of the counterweight block in the hoisting process can be automatically detected, and alignment analysis and guide operation are performed, so that the mounting efficiency of the counterweight block can be effectively improved.

The present invention provides a crane counterweight block alignment detection and control method. A counterweight block is provided with a mounting hole for matching with a positioning pin on a crane. The method comprises: detecting a center position of the counterweight block, and calculating a relative offset between the center position and a position of the positioning pin; detecting a relative orientation between the mounting hole in the counterweight block and the positioning pin, and calculating, according to the relative orientation, a relative rotation angle of the counterweight block for aligning the mounting hole with the positioning pin; and controlling, according to the relative offset and the relative rotation angle, the movement of the counterweight block to enable the mounting hole in the counterweight block to be aligned with and installed onto the positioning pin.

Optionally, the counterweight block is provided with at least two mounting holes for matching with at least two positioning pins on the crane; the position of the positioning pin is a center position between the at least two positioning pins; detecting a relative orientation between the mounting hole in the counterweight block and the positioning pin, and calculating, according to the relative orientation, a relative rotation angle of the counterweight block comprises: detecting the positions of the at least two mounting holes and the positions of the at least two positioning pins, and calculating, according to the positions of the at least two mounting holes and the positions of the at least two positioning pins, the relative rotation angle of the counterweight block.

Optionally, detecting a center position of the counterweight block and detecting a relative orientation between the mounting hole in the counterweight block and the positioning pin comprise: acquiring an image of the counterweight block, and segmenting out one or more foreground target regions from the image; extracting edge features of the one or more foreground target regions; matching the edge feature of each foreground target region of the extracted one or more foreground target regions with an edge feature related to the counterweight block in a pre-established standard model library, and calculating a match value; determining that the corresponding foreground target region corresponds to the counterweight block in a case that the match value is greater than a threshold; and determining, according to the corresponding foreground target region corresponding to the counterweight block, the center position of the counterweight block, and the relative orientation between the mounting hole in the counterweight block and the positioning pin.

Optionally, determining, according to the corresponding foreground target region corresponding to the counterweight block, the center position of the counterweight block comprises: calculating a minimum bounding rectangle of the corresponding foreground target region, and calculating a center position of the minimum bounding rectangle to serve as the center position of the counterweight block.

Optionally, the counterweight block is provided with at least two mounting holes for matching with at least two positioning pins on the crane;

detecting the relative orientation between the mounting hole in the counterweight block and the positioning pin, and calculating, according to the relative orientation, the relative rotation angle of the counterweight block comprises: detecting the positions of the at least two mounting holes and the positions of the at least two positioning pins, and calculating, according to the positions of the at least two mounting holes and the positions of the at least two positioning pins, the relative rotation angle of the counterweight block; detecting the positions of the at least two mounting holes comprises: detecting a circular hole object in the corresponding foreground target region according to Hough circle transformation, and calculating the center coordinates of the circular hole object through subpixel-level edge fitting to serve as the positions of the at least two mounting holes.

Optionally, segmenting out one or more foreground target regions from the image comprises: transforming the image from a time domain space to a frequency domain space by wavelet transform for filtering and denoising processing; and performing one or more of the following operations on the filtered and denoised image so as to segment out one or more foreground target regions: edge detection, morphological processing, and HSV color space based color feature extraction.

Optionally, the filtering and denoising processing comprises: determining a high-frequency part and a low-frequency part of the image in the frequency domain space; multiplying a decomposition coefficient by a positive value less than 1 to weaken details when the decomposition coefficient is less than a first threshold at the high-frequency part; and multiplying the decomposition coefficient by a value greater than 1 to highlight a contour when the decomposition coefficient is greater than a second threshold at the low-frequency part.

Optionally, controlling, according to the relative offset and the relative rotation angle, the movement of the counterweight block comprises: controlling, according to the relative offset, operation of a slewing mechanism, a luffing mechanism and/or a hoisting mechanism of the crane, so that the relative offset is located in a preset alignment error range; controlling an attraction part of a rotating mechanism to be lifted upward to be attracted to the bottom end of the counterweight block, and controlling, according to the relative rotation angle, the attraction part to rotate so as to drive the counterweight block to rotate; and controlling the attraction part to be lowered to enable the mounting hole in the counterweight block to be aligned with and installed onto the positioning pin.

Correspondingly, the present invention further provides a crane counterweight block alignment detection and control device. A counterweight block is provided with a mounting hole for matching with a positioning pin on a crane. The device comprises: a detection device, used for detecting a center position of the counterweight block, and a relative orientation between the mounting hole in the counterweight block and the positioning pin; and a control device, used for performing the following operations: calculating, according to the center position of the counterweight block and the position of the positioning pin, a relative offset between the center position of the counterweight block and the position of the positioning pin; calculating, according to the relative orientation, a relative rotation angle of the counterweight block for aligning the mounting hole with the positioning pin; and controlling, according to the relative offset and the relative rotation angle, the movement of the counterweight block to enable the mounting hole in the counterweight block to be aligned with and installed onto the positioning pin.

Optionally, the counterweight block is provided with at least two mounting holes for matching with at least two positioning pins on the crane;

the position of the positioning pin is a center position between the at least two positioning pins; detecting the relative orientation between the mounting hole in the counterweight block and the positioning pin, and calculating, according to the relative orientation, the relative rotation angle of the counterweight block comprises: detecting the positions of the at least two mounting holes and the positions of the at least two positioning pins, and calculating, according to the positions of the at least two mounting holes and the positions of the at least two positioning pins, the relative rotation angle of the counterweight block.

Optionally, detecting the center position of the counterweight block and detecting the relative orientation between the mounting hole in the counterweight block and the positioning pin comprises: acquiring an image of the counterweight block, and segmenting out one or more foreground target regions from the image; extracting edge features of the one or more foreground target regions; matching the edge feature of each foreground target region of the extracted one or more foreground target regions with an edge feature related to the counterweight block in a pre-established standard model library, and calculating a match value; determining that the corresponding foreground target region corresponds to the counterweight block in a case that the match value is greater than a threshold; and determining, according to the corresponding foreground target region corresponding to the counterweight block, the center position of the counterweight block, and the relative orientation between the mounting hole in the counterweight block and the positioning pin.

Optionally, determining, according to the corresponding foreground target region corresponding to the counterweight block, the center position of the counterweight block comprises: calculating a minimum bounding rectangle of the corresponding foreground target region, and calculating a center position of the rectangle to serve as the center position of the counterweight block.

Optionally, the counterweight block is provided with at least two mounting holes for matching with at least two positioning pins on the crane;

detecting the relative orientation between the mounting hole in the counterweight block and the positioning pin, and calculating, according to the relative orientation, the relative rotation angle of the counterweight block comprises: detecting the positions of the at least two mounting holes and the positions of the at least two positioning pins, and calculating, according to the positions of the at least two mounting holes and the positions of the at least two positioning pins, the relative rotation angle of the counterweight block; detecting the positions of the at least two mounting holes comprises: detecting a circular hole object in the corresponding foreground target region according to Hough circle transformation, and calculating the center coordinates of the circular hole object through subpixel-level edge fitting to serve as the positions of the at least two mounting holes.

Optionally, segmenting out one or more foreground target regions from the image comprises: transforming the image from a time domain space to a frequency domain space by wavelet transform for filtering and denoising processing; and performing one or more of the following operations on the filtered and denoised image so as to segment out one or more foreground target regions: edge detection, morphological processing, and HSV color space based color feature extraction.

Optionally, the filtering and denoising processing comprises: determining a high-frequency part and a low-frequency part of the image in the frequency domain space; multiplying a decomposition coefficient by a positive value less than 1 to weaken details when the decomposition coefficient is less than a first threshold at the high-frequency part; and multiplying the decomposition coefficient by a value greater than 1 to highlight a contour when the decomposition coefficient is greater than a second threshold at the low-frequency part.

Optionally, controlling, according to the relative offset and the relative rotation angle, the movement of the counterweight block comprises: controlling, according to the relative offset, operation of a slewing mechanism, a luffing mechanism and/or a hoisting mechanism of the crane, so that the relative offset is located in a preset alignment error range; controlling an attraction part of a rotating mechanism to be lifted upward to be attracted to the bottom end of the counterweight block, and controlling, according to the relative rotation angle, the attraction part to rotate so as to drive the counterweight block to rotate; and controlling the attraction part to be lowered to enable the mounting hole in the counterweight block to be aligned with and installed onto the positioning pin.

Optionally, the device further comprises the rotating mechanism, wherein the rotating mechanism comprises: the attraction part, used for attracting the counterweight block; a telescoping part, used for driving the attraction part to extend and retract; and a slewing part, used for driving the attraction part to rotate.

Correspondingly, the present invention further provides a crane. The crane comprises the crane counterweight block alignment detection and control device.

Correspondingly, a machine readable storage medium is provided. The machine readable storage medium stores an instruction; and the instruction is used to enable a machine to perform the above crane counterweight block alignment detection and control method.

At present, the counterweight block alignment process of the crane is mainly implemented by manual operation. However, according to the present invention, the position of the counterweight block can be positioned and detected in real time in the hoisting process of the counterweight block, the relative offset and rotation angle between the counterweight block and the specified placement position are calculated, and then motion of the slewing mechanism, the hoisting mechanism and/or the luffing mechanism of the crane is controlled according to the relative offset and rotation angle, and the motion of the additional rotating mechanism is controlled, so that automatic alignment of the counterweight block is realized, human intervention is not required, and the digital construction requirement can be met.

Other features and advantages of the embodiments of the present invention will be described in detail in the section of "Detailed Description of the Embodiments".

BRIEF DESCRIPTION OF DRAWINGS

The accompanying drawings are used to provide a further understanding of the embodiments of the invention and form a part of the description, and are used to explain the embodiments of the invention together with the following specific embodiments, but do not constitute a limitation on the embodiments of the invention. In the drawings.

Figure 1:
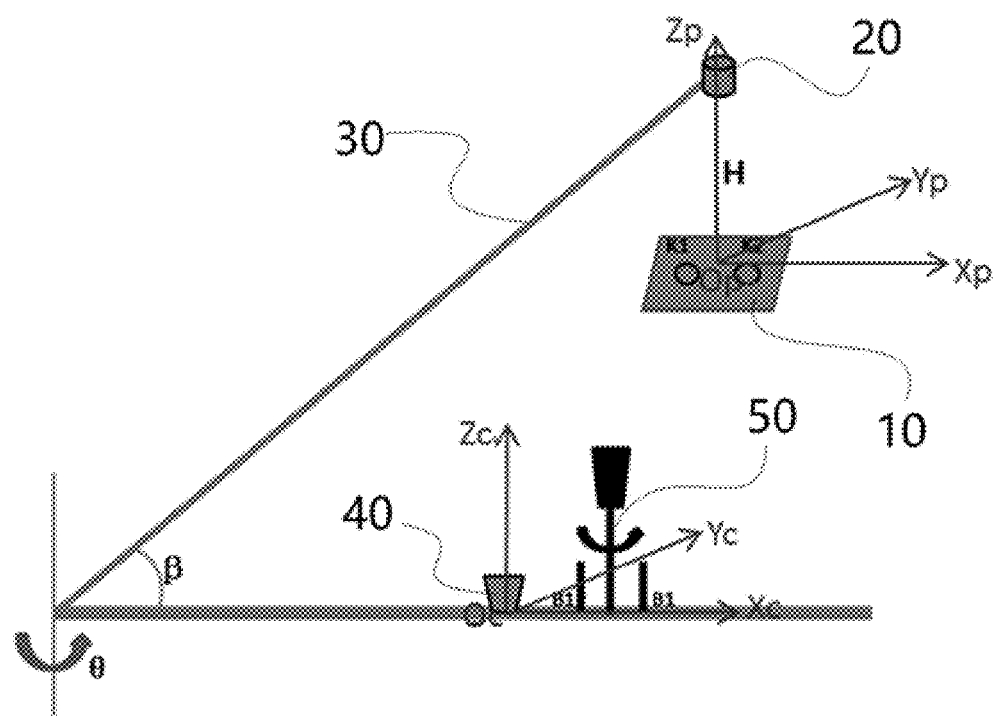
FIG. 1 is a schematic diagram of a working process of a crane counterweight block alignment detection and control device provided by an embodiment of the present invention.

| Description of reference numerals | |
|---|---|
| 10 counterweight block | 20 distance-measuring sensor |
| 30 crane jib | 40 video camera |
| 50 rotating mechanism | 51 attraction part |
| 52 telescoping part | 53 slewing part |
| P1 initial position | P2 lifting position |
| B1, B2 positioning pin | K1, K2 mounting hole |

DETAILED DESCRIPTION OF THE EMBODIMENTS

The specific implementation manners of embodiments of the present invention will be described below in detail with reference to the accompanying drawings. It should be understood that the specific implementation manners described herein are only used to illustrate and interpret the present invention and are not intended to limit the embodiments of the present invention.

It should be noted that the following description illustrates the implementation manners of the present invention by taking the case where the counterweight block is provided with a mounting hole for matching with the positioning pin on the crane, but those skilled in the art may understand that the "positioning pin" and the "mounting hole" here are at least a specific mounting matching manner of the counterweight block on the crane, other mounting matching manners capable of mounting the counterweight block on the crane are also feasible, and the positions of the positioning pin and the mounting hole are interchangeable, for example, the "positioning pin" can be located on the "counterweight block", and the "mounting hole" can be located on the "crane". In addition, the following embodiments have mentioned that the number of the "positioning pins" and the number of the "mounting holes" are two respectively, but the present invention is not limited to this, and other numbers of "positioning pins" and "mounting holes" are also applicable. In addition, the following embodiments have mentioned "the relative orientation between the mounting hole and the positioning pin". The "relative orientation" is detected by detecting the positions of two "mounting holes" and two "positioning pins", but the present invention is not limited to this. The relative orientation between assembling parts can also be recognized by recognizing the relative orientation between the assembling parts with different shapes. In addition, the following embodiments have mentioned that the shape of the "mounting hole" is a "circular hole", actually, the mounting hole can be holes with other shapes, and the present invention is not limited to this. On the whole, the solution of the present invention is not limited to the specific configuration given by examples in the following description, and any manner capable of realizing matching of the counterweight block and the corresponding mounting position of the counterweight block on the crane is feasible.

FIG. 1 is a schematic diagram of the working process of a crane counterweight block alignment detection and control device according to an embodiment of the present invention. As shown in FIG. 1, a counterweight block 10 is hoisted by a crane jib 30 of a crane, and the counterweight block 10 is provided with two mounting holes K1 and K2 for matching with and mounting through positioning pins B1 and B2 on the crane. A video camera 40 is mounted beside the positioning pins B1 and B2, with a lens facing upwards, so as to acquire an image about the counterweight block 10 hoisted by the crane jib 30. A distance-measuring sensor 20 is mounted at the tail end of the crane jib 30 for recording a height H from the counterweight block to the tail end of the cane jib in real time. The H value can be applied to the coordinate conversion process described below, and can be combined into a Zhang Zhengyou calibration formula to transform the two-dimensional image coordinates of a target point into a spatial three-dimensional coordinate value. A rotating mechanism 50 is mounted between the two positioning pins B1 and B2. The rotating mechanism 50 can perform up-and-down telescoping and rotating motion to drive the counterweight block to rotate, so that the mounting holes in the counterweight block are aligned with and installed onto the positioning pins. The structure and working principle of the rotating mechanism 50 will be described in detail below with reference to FIG. 3.

Figure 2:
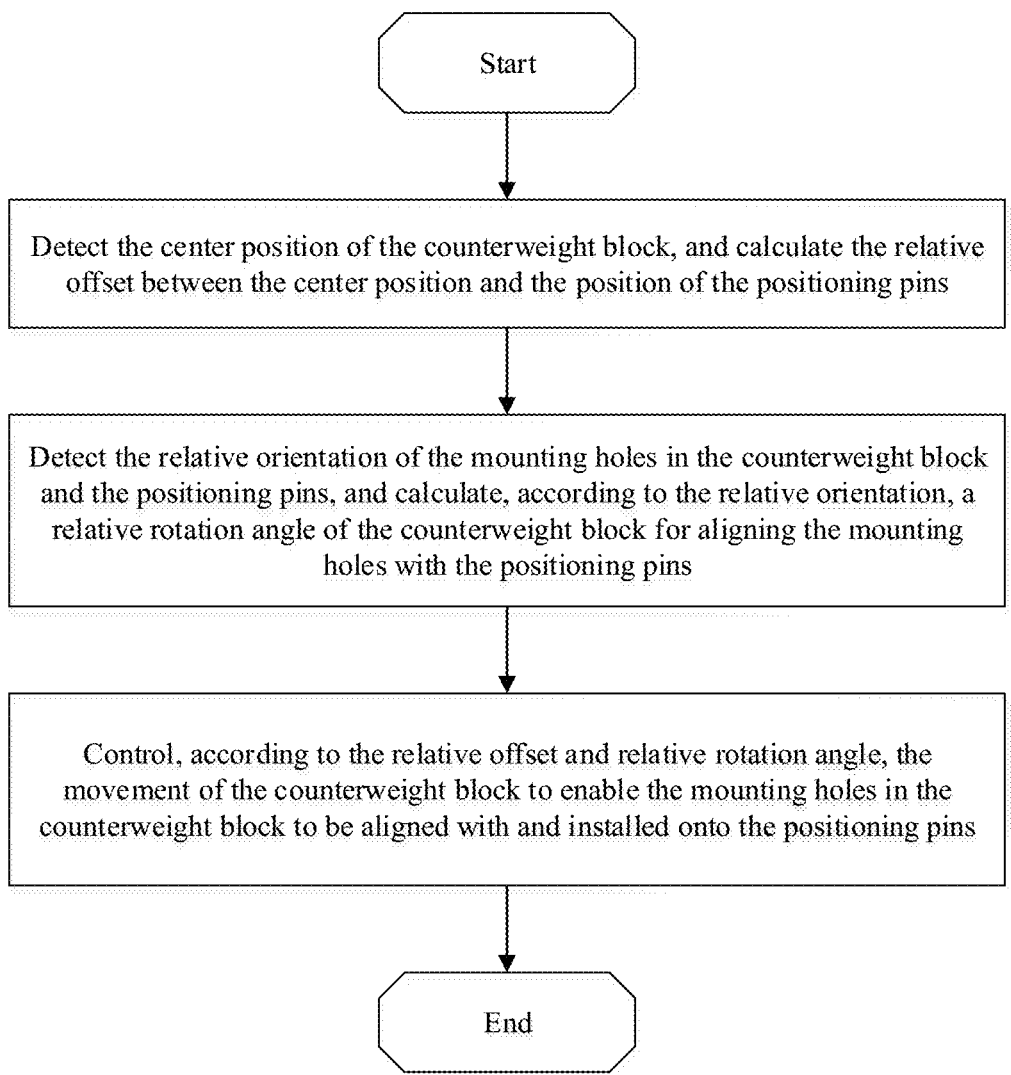
FIG. 2 is a working flowchart of a crane counterweight block alignment detection and control method provided by an embodiment of the present invention.

FIG. 2 is a working flowchart of a crane counterweight block alignment detection and control method according to an embodiment of the present invention. As shown in FIG. 2, the crane counterweight block alignment detection and control method provided by one embodiment of the present invention comprises: detecting a center position of the counterweight block, and calculating a relative offset between the center position and a position of the positioning pin; detecting a relative orientation between the mounting hole in the counterweight block and the positioning pin, and calculating, according to the relative orientation, a relative rotation angle of the counterweight block for aligning the mounting hole with the positioning pin; and controlling, according to the relative offset and the relative rotation angle, the movement of the counterweight block to enable the mounting hole in the counterweight block to be aligned with and installed onto the positioning pin. According to the present invention, the position of the counterweight block can be positioned and detected in real time in the hoisting process of the counterweight block, the relative offset and rotation angle between the counterweight block and the specified placement position are calculated, and then motion of a slewing mechanism, a hoisting mechanism and/or a luffing mechanism of the crane is controlled according to the relative offset and rotation angle, and the motion of the additional rotating mechanism is controlled, so that automatic alignment of the counterweight block is realized, human intervention is not required, and the digital construction requirement can be met.

Figure 3:
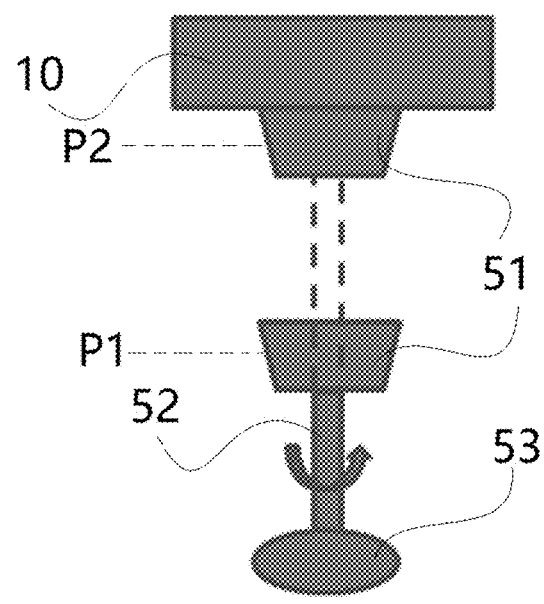
FIG. 3 is a structural schematic diagram of a rotating mechanism provided by an embodiment of the present invention.

FIG. 3 is a structural schematic diagram of a rotating mechanism according to an embodiment of the present invention. As shown in FIG. 3, the rotating mechanism 50 comprises three parts: an attraction part 51, a telescoping part 52 and a slewing part 53. In an initial state, the rotating mechanism 50 is retracted into a crane body, and the attraction part 51 is located at an initial position P1; when the counterweight block 10 arrives at the position above the positioning pins B1 and B2, the telescoping part 52 of the rotating mechanism 50 can be controlled to be lifted upward, so that the attraction part 51 is lifted upward to a specified position (for example, a position P2 shown in FIG. 3) to attract the counterweight block 10; then the slewing part 53 can be controlled to rotate according to the calculated rotation angle so as to drive the attraction part 51 and the counterweight block 10 attracted by the attraction part 51 to rotate, so that the mounting holes K1 and K2 in the counterweight block are aligned with the positioning pins B1 and B2; and afterwards, the telescoping part can be controlled to retract, so that the counterweight block 10 is placed at the specified position, that is, the mounting holes K1 and K2 in the counterweight block are aligned with and installed onto the positioning pins B1 and B2.

The attraction part 51 can adopt a device with magnetism or capable of generating magnetism through electricity, can attract the counterweight block, and certainly can adopt other forms of devices capable of attracting the counterweight block. The telescoping part 52 can be a hydraulic oil cylinder, and certainly can also adopt other parts capable of extending and retracting, such as an electric telescoping rod and the like.

When the counterweight block 10 arrives at the position above the positioning pins B1 and B2 (the relative offset between a center point of the counterweight block and a center point of the two positioning pins is calculated in real time, when the value of the relative offset is controlled within a certain error range, that is, the condition that the counterweight block 10 arrives at the position above the positioning pins B1 and B2 is met), the rotating mechanism is controlled to be lifted upward to the specified position to attract the counterweight block. The center $P_{center}$ of the counterweight block and the circular hole centers C1 and C2 of the two mounting holes are obtained through an image analysis technology, the obtained center of the counterweight block and two circular hole centers in the two-dimensional plane coordinate system are transformed into the coordinates in a three-dimensional world coordinate system through a coordinate system transformation relationship, the current relative offset and rotation angle between the counterweight block and the positioning pins can be calculated by combining with the three-dimensional coordinate points of the positioning pins, and finally, operations of the rotating mechanism, the luffing mechanism and the hoisting mechanism of the crane and the rotating operation of the rotating mechanism are controlled according to the calculation result to realize the final alignment of the counterweight block.

Figure 4:
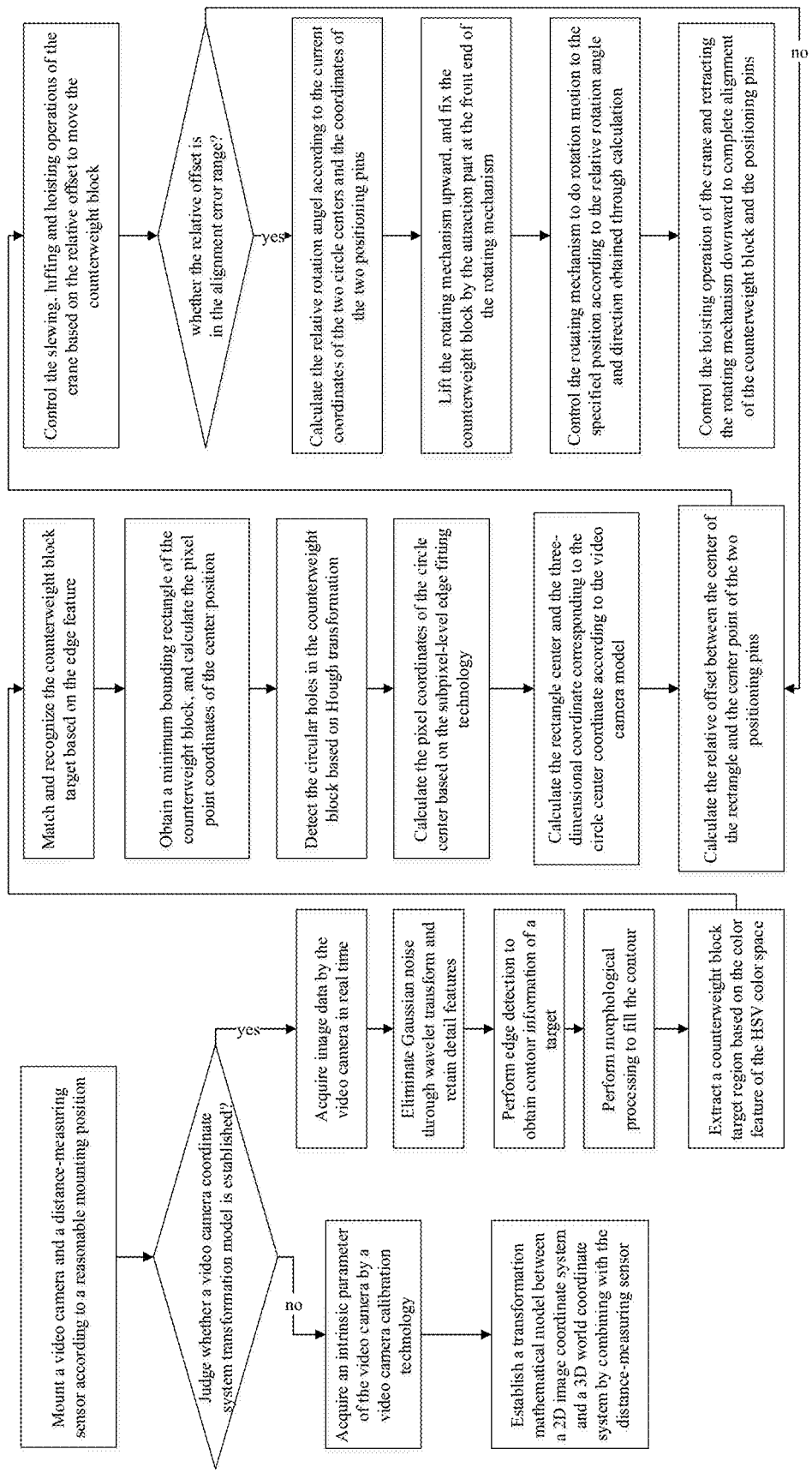
FIG. 4 is a working flowchart of a crane counterweight block alignment detection and control method provided by an embodiment of the present invention.

FIG. 4 is a working flowchart of a crane counterweight block alignment detection and control method according to an embodiment of the present invention. As shown in FIG. 4, the crane counterweight block alignment detection and control method provided by one embodiment of the present invention can comprise the following steps: firstly, fixing a video camera and a distance-measuring sensor according to the system schematic diagram, and stipulating a world coordinate system of the video camera and a world coordinate system of a counterweight block; then establishing a coordinate system mathematical transformation model; then acquiring and processing an image of the counterweight block, and determining a relative offset and rotation angle between the counterweight block and positioning pins; and controlling operations of a rotating mechanism, a luffing mechanism and a hoisting mechanism of a crane and the rotating operation of the rotating mechanism according to the relative offset and rotation angle, thereby realizing the final alignment of the counterweight block. The details are as follows:

Establishing a Coordinate System Mathematical Transformation Model a video camera is calibrated by a Zhang Zhengyou calibration method, an intrinsic parameter of a video camera model is calculated, and a distance-measuring sensor is combined to establish a mathematical transformation model between a two-dimensional image coordinate system and a three-dimensional spatial coordinate system of the video camera;

$$Z_c \begin{bmatrix} u \\ v \\ 1 \end{bmatrix} = \begin{bmatrix} \alpha_u & s & u_0 \\ 0 & \alpha_v & v_0 \\ 0 & 0 & 1 \end{bmatrix} [R\ t] \begin{bmatrix} X_w \\ Y_w \\ Z_w \\ 1 \end{bmatrix}$$

the video camera model formula is:

wherein $\alpha_u$ and $\alpha_v$ are respectively scale factors on a u axis and a v axis of the image, $(u_0, v_0)$ is a main point coordinate, s is a parameter for describing the inclination degree of two image coordinate axes, which are collectively referred to intrinsic parameters of the video camera; [R t] is called an extrinsic parameter of the video camera and is composed of a rotation matrix and a translation vector, [u v] represents a coordinate value of a certain point in the image plane, and [Xw Yw Zw] represents a coordinate value of a certain point in the image plane corresponding to the world coordinate system;

Acquiring and Processing the Image of the Counterweight Block

The process mainly comprises: analyzing data obtained by the image acquisition, extracting and recognizing a counterweight block object, and calculating a relative offset of the counterweight block object relative to a specified position. The details are as follows:

1) image data is transformed from a time domain space to a frequency domain space by wavelet transform for filtering processing, that is, a boundary value of high and low frequencies are set, the part greater than the boundary value is determined to have high frequency, otherwise, the part is determined to have low frequency, wherein at the high-frequency part, when a decomposition coefficient (which is a coefficient of a wavelet basis function similar to the original signal) is less than 150, the coefficient is multiplied by a positive value less than 1 (such as 0.75) for weakening details; and at the low-frequency part, when the decomposition coefficient is greater than 250, the coefficient is multiplied by a positive value greater than 1 (such as 1.5) for highlighting a contour, so that Gaussian noise can be eliminated and detail features can be retained;

2) the filtered and denoised image data is subjected to image preprocessing operation, including edge detection (a Canny edge detection operator with an adaptive threshold is adopted herein), morphological processing, and extraction of a region of interest of the counterweight block based on color feature of an HSV color space, so as to segment out one or more foreground target regions; and 3) all extracted to-be-matched foreground target regions are traversed, and the foreground target region corresponding to the counterweight block is determined through feature matching. The operation specifically comprises the following steps:

3.1 a standard model database of several kinds of to-be-recognized counterweight blocks with different shapes based on edge features (or shape features) is established;

3.2 edge features of to-be-recognized foreground target regions are extracted;

3.3 feature matching is performed on the to-be-recognized foreground target region and the features of Hu invariant moment, contour tree and chain code coding histogram of the standard model library with dimension zooming and rotational invariance according to the extracted edge feature, for example, the match value of the three features (that is, Hu invariant moment, contour tree and chain code coding histogram) can be calculated respectively according to a similarity degree measurement, binary tree and a histogram matching method, the matched result calculated by the three features is given a certain weight for combined application, and finally whether there is a counterweight block object in the to-be-recognized region is determined; certainly, although the three features such as Hu invariant moment, contour tree and chain code coding histogram with dimension zooming and rotational invariance are listed above and whether there is a counterweight block object in the to-be-recognized region is determined according to the three features, the present invention is not limited to this, whether there is a counterweight block object in the to-be-recognized region is determined by one or any combination of more of the three features and other features with the dimension zooming and rotational invariance known in the art.

The similarity degree measurement is defined as follows:

$$I(A, B) = \sum_{i=1}^{7} |m_i^A - m_i^B|$$

wherein $m_i^A$ and $m_i^B$ are defined as follows:

$$m_i^A = \text{sign}\,(h_i^A) \cdot \log |h_i^A|$$
$$m_i^B = \text{sign}\,(h_i^B) \cdot \log |h_i^B|$$

wherein $h_i^A$ and $h_i^B$ are respectively Hu moments of A and B, and A and B are respectively the to-be-recognized foreground target region and the standard region corresponding to the counterweight block stored in the standard model database.

3.4 If the match value between the to-be-recognized foreground target region and the feature in the standard model base is greater than a certain threshold, the to-be-recognized foreground target region can be determined as the counterweight block object, otherwise, it can be determined that the counterweight block object is not detected.

4) Then, a minimum bounding rectangle of the foreground target region serving as the counterweight block object can be calculated, the center point coordinate $P_{center}$ of the rectangle is calculated, and the three-dimensional spatial coordinate corresponding to the point is calculated according to the video camera calibration model formula.

5) A circular hole object in the foreground target region serving as the counterweight block object is detected according to Hough circle transformation, the circle center coordinate is calculated by a subpixel-level edge fitting technology, and the three-dimensional spatial coordinate $C_{center}$ corresponding to the point is calculated according to the video camera calibration model formula.

6) As shown in FIG. 1, relative offsets dx and dy in the XOY coordinate plane are calculated respectively according to the center point coordinate $P_{center}(x, y)$ and the center $P'_{center}(x', y')$ of the two positioning pins in the world coordinate system Oc-XYZ.

$$dx = |x - x'|$$
$$dy = |y - y'|$$

Moving the Counterweight Block

Figure 5A:
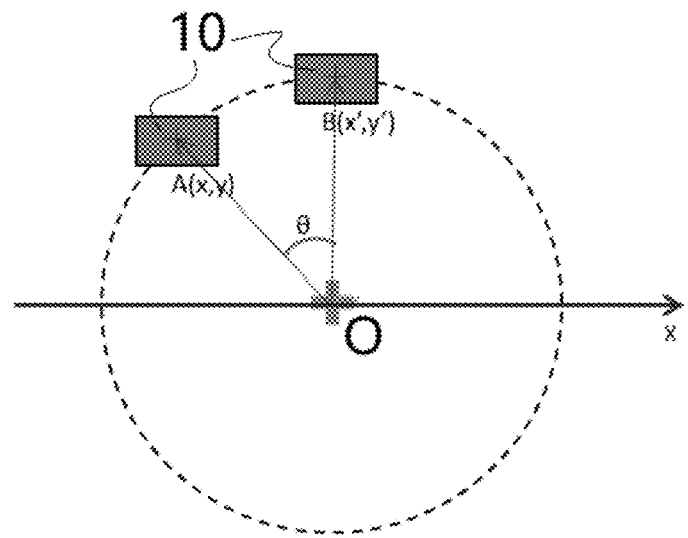
FIG. 5A is a schematic diagram of a working process in which a slewing mechanism of a crane performs slewing to move a counterweight block.

The counterweight block is moved to be above the positioning pins by controlling the slewing, luffing and/or hoisting operation of the crane according to the translation vector (dx, dy) obtained through calculation, and the center coordinate point $P_{center}$ of the counterweight block is aligned with the center $P'_{center}$ of the two positioning pins:

as shown in FIG. 5A, O is a slewing center, and the offset dx of the counterweight block 10 in an x axis direction is realized by controlling the slewing motion of the crane jib.

The calculation mode of the slewing angle θ is:

$$\beta = \cos^{-1}\left(\frac{y}{L}\right) - \cos^{-1}\left(\frac{y'}{L}\right),$$

Figure 5B:
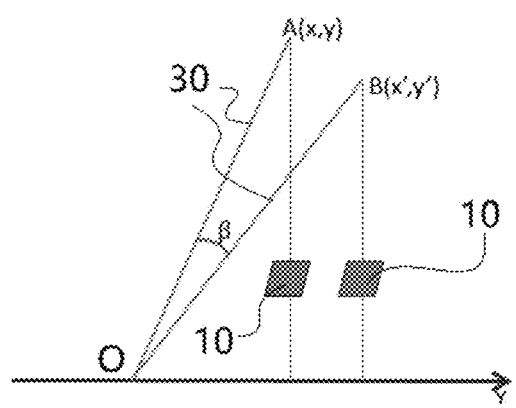
FIG. 5B is a schematic diagram of a working process in which a luffing mechanism of a crane performs luffing to move a counterweight block.

As shown in FIG. 5B, O is a luffing center, and the offset dy of the counterweight block 10 in a y axis direction is realized by controlling the luffing motion of the crane jib. The calculation mode of the luffing angle β is: $\beta = \cos^{-1}(y/L) - \cos^{-1}(y'/L)$.

wherein L is a length of the crane jib.

Figure 5C:
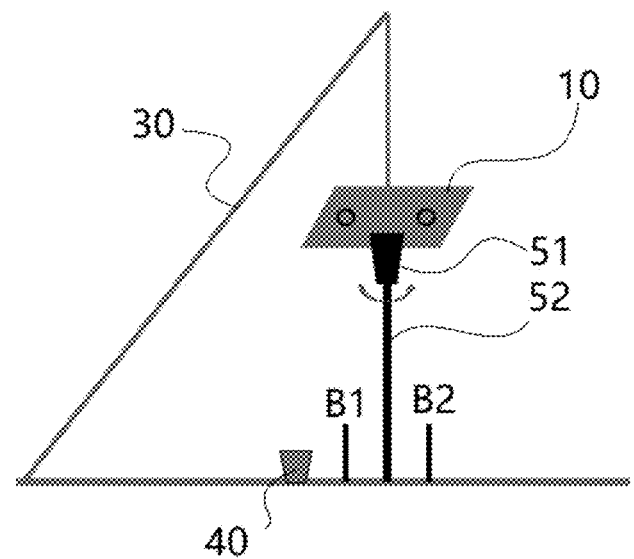
FIG. 5C is a schematic diagram of a working process of a rotating mechanism.
Figure 5D:
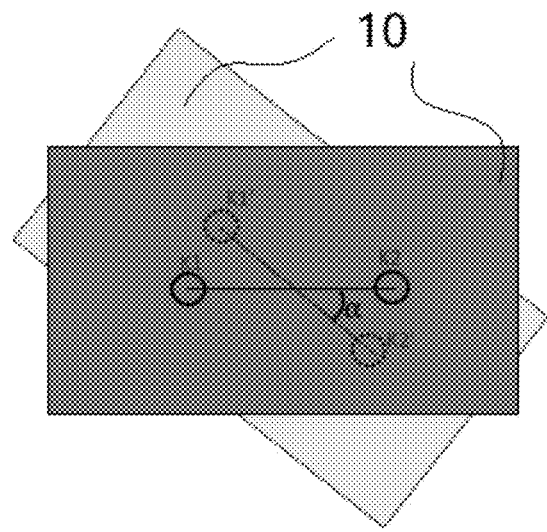
FIG. 5D is a schematic diagram of a working process in which a rotating mechanism drives the counterweight block to be aligned with positioning pins.

The counterweight block can be moved from a position A in any space to a position B at a certain height above the positioning pins through the above slewing motion and luffing motion, so that when the relative offset between the center point $P_{center}(x, y)$ of the counterweight block and the center $P'_{center}(x', y')$ of the two positioning pins is within an alignment error range, as shown in FIG. 5C, the rotating mechanism at the center position of the two positioning pins is lifted upward until the attraction part at the front end of the rotating mechanism is tightly attached to the counterweight block, and then the rotating mechanism rotates the counterweight block 10 according to the size and the direction of the rotation angle α until two circular holes of the counterweight block 10 are aligned with the positioning pins. The calculation method of the rotation angle α is as follows:

As shown in FIG. 5D, k1(x1, y1) and k2(x2, y2) are defined as the coordinates of the two positioning pins respectively, and k1'(x1', y1') and k2'(x2', y2') are the current center coordinates of the two circular holes of the counterweight block. The rotation angle α is calculated through these coordinate points:

$$\alpha = \cos^{-1}\left(\frac{\overline{m} * \overline{n}}{|\overline{m}| \cdot |\overline{n}|}\right) \text{ wherein}$$

$$\overline{m} = (x1 - x2, y1 - y2), \overline{n} = (x1' - x2', y1 - y2');$$

Then, the alignment operation of the counterweight block and the positioning pins can be completed by controlling the hoisting operation of the crane and retracting the rotating mechanism downward, that is, the counterweight block is placed on the positioning pins.

It should be noted that although the working flowchart of the crane counterweight block alignment detection and control method shown in FIG. 4 describes the working process of the present invention according to a certain sequence, the present invention is not limited to the specific working sequence, and some adjustment can be made according to the actual working condition. For example, calculation of "rotation angle" can be completed at the stage of "acquiring and processing the counterweight block image", but is not necessarily completed after the counterweight block is moved to be above the positioning pins. Adjustment of the counterweight block according to the "rotation angle" is not necessarily completed after the counterweight block is moved to be above the positioning pins, and can also be completed at other appropriate time.

According to the solution of the present invention, counterweight block detection and posture positioning can be realized on the basis of a machine vision technology; the relative offset is calculated according to the center posture coordinate of the counterweight block and the center position coordinate of the two positioning pins; the relative rotation angle is calculated according to the circle center posture coordinates of two circular holes of the counterweight block and the position coordinates of the two positioning pins; on the basis that the relative offset is decomposed into the composite motion of hoisting, luffing and rotating of the crane, the counterweight block is moved to be above the positioning pins from a certain position; and through one rotating mechanism, when the relative offset is less than a certain threshold, the rotating mechanism is lifted, the attraction part of the mechanism attracts the counterweight block, and then motion of the rotating mechanism is controlled according to the rotation angle obtained through calculation, so that the final alignment operation of the counterweight block and the positioning pins is realized.

The control device included in the crane counterweight block alignment detection and control device provided by the present invention can comprise a processor and a memory, various operations performed by the control device can serve as program units to be stored in the memory, and the processor executes the above program units stored in the memory to realize the corresponding functions.

The processor includes a kernel, and is used for calling the corresponding program units in the memory via the kernel. One or more kernels can be provided, and the crane counterweight block alignment detection and control are realized by adjusting a kernel parameter.

The memory may comprise a non-permanent memory, a random access memory (RAM) and/or a non-volatile memory in a computer readable medium such as a read-only memory (ROM) or a flash RAM. The memory comprises at least one memory chip.

Embodiments of the present invention provide a storage medium. The storage medium stores a program. When the program is executed by a processor, the crane counterweight block alignment detection and control method is implemented.

Embodiments of the present invention provide a processor. The processor is used for running a program, wherein when the program runs, the crane counterweight block alignment detection and control method is performed.

Embodiments of the present invention provide a device. The device comprises a processor, a memory, and a program stored in the memory and capable of running on the processor. When the processor executes the program, the crane counterweight block alignment detection and control method is implemented. The device herein can be a server, a PC, a PAD, a mobile phone and the like.

The present application further provides a computer program product. When being performed on a data processing device, the computer program product is suitable for executing the program for initializing the steps included in the crane counterweight block alignment detection and control method.

Those skilled in the art should understand that the embodiments of the present application can be provided as a method, a system, or a computer program product. Therefore, the present application can adopt a form of hardware only embodiments, software only embodiments, or embodiments with a combination of software and hardware. Moreover, the present application can adopt a form of a computer program product that is implemented on one or more computer-usable storage media (including but not limited to a disk memory, a CD-ROM, an optical memory, and the like) that include computer-usable program codes.

The present application is described with reference to a flowchart and/or block diagram of a method, a device (system), and a computer program product according to embodiments of the present application. It should be understood that computer program instructions can be used to implement each process and/or each block in the flowcharts and/or the block diagrams and a combination of a process and/or a block in the flowcharts and/or the block diagrams. These computer program instructions can be provided to a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions can also be stored in a computer readable memory that can instruct the computer or any other programmable data processing device to work in a specific manner, so that the instructions stored in the computer readable memory generate a manufacture that comprises an instruction apparatus. The instruction apparatus implements a specific function in one or more processes in the flowcharts and/or in one or more blocks in the block diagrams.

These computer program instructions can also be loaded onto a computer or other programmable data processing devices, so that a series of operations and steps are performed on the computer or other programmable devices, thereby generating computer-implemented processing. Therefore, the instructions executed on the computer or other programmable devices provide steps for implementing a specific function in one or more processes in the flowcharts and/or in one or more blocks in the block diagrams.

In a typical configuration, a computing device comprises one or more processors (CPU), input/output interfaces, network interfaces, and memories.

The memory may comprise a non-permanent memory, a random access memory (RAM), a non-volatile memory, and/or the like in a computer readable medium such as a read-only memory (ROM) or a flash RAM. The memory is an example of the computer readable medium.

The computer readable medium comprises permanent and non-permanent, removable and non-removable media, which can store information by using any method or technology. The information can be computer readable instructions, data structures, modules of programs, or other data. Examples of the computer storage medium include but are not limited to: a phase-change memory (PRAM), a static random access memory (SRAM), a dynamic random access memory (DRAM), other types of random access memory (RAM), a read-only memory (ROM), an electrically erasable programmable read-only memory (EEPROM), a flash memory or other memory technologies, a compact disc read-only memory (CD-ROM), a digital video disc (DVD) or other optical memory, a magnetic cassette, magnetic disk storage, other magnetic storage devices, and any other non-transmission medium that may be used for storing information that can be accessed by a computing device. As defined herein, the computer readable medium does not include computer readable transitory media, such as modulated data signals and carriers.

It should further be noted that, the terms "comprise", "include" and any other variants thereof are intended to cover non-exclusive inclusion, so that a process, a method, a commodity, or a device that comprises a series of elements not only comprises these elements, but also comprises other elements not expressly listed, or also comprise elements inherent to this process, method, commodity, or device. Without more restrictions, an element defined by the phrase "comprising a . . . " does not exclude the presence of another same element in a process, method, product, or device that comprises the element.

Those skilled in the art should understand that the embodiments of the present application can be provided as a method, a system, or a computer program product. Therefore, the present application can adopt a form of hardware only embodiments, software only embodiments, or embodiments with a combination of software and hardware. Moreover, the present application can adopt a form of a computer program product that is implemented on one or more computer-usable storage media (including but not limited to a disk memory, a CD-ROM, an optical memory, and the like) that include computer-usable program codes.

The above is only an embodiment of the present application and is not intended to limit the present application. For those skilled in the art, the present application can have various modifications and changes. Any modifications, equivalent substitutions, improvements, etc. made within the spirit and principle of the present application should be included within the scope of the claims of the present application.

The invention claimed is:

1. A crane counterweight block alignment detection and control method, the counterweight block being provided with a mounting hole for matching with a positioning pin on the crane, wherein the method comprises:
   detecting a center position of the counterweight block, and calculating a relative offset between the center position and a position of the positioning pin;
   detecting a relative orientation between the mounting hole in the counterweight block and the positioning pin, and calculating, according to the relative orientation, a relative rotation angle of the counterweight block for aligning the mounting hole with the positioning pin; and
   controlling, according to the relative offset and the relative rotation angle, the movement of the counterweight block to enable the mounting hole in the counterweight block to be aligned with and installed onto the positioning pin.

2. The crane counterweight block alignment detection and control method according to claim 1, wherein
   the counterweight block is provided with at least two mounting holes for matching with at least two positioning pins on the crane;
   the position of the positioning pin is a center position between the at least two positioning pins;
   the detecting the relative orientation between the mounting hole in the counterweight block and the positioning pin, and calculating, according to the relative orientation, the relative rotation angle of the counterweight block comprises: detecting the positions of the at least two mounting holes and the positions of the at least two positioning pins, and calculating, according to the positions of the at least two mounting holes and the positions of the at least two positioning pins, the relative rotation angle of the counterweight block.

3. The crane counterweight block alignment detection and control method according to claim 1, wherein the detecting the center position of the counterweight block and the detecting the relative orientation between the mounting hole in the counterweight block and the positioning pin comprise:
   acquiring an image of the counterweight block, and segmenting out one or more foreground target regions from the image;
   extracting edge features of the one or more foreground target regions;
   matching the edge feature of each foreground target region of the extracted one or more foreground target regions with an edge feature related to the counterweight block in a pre-established standard model library, and calculating a match value;
   determining that the corresponding foreground target region corresponds to the counterweight block in a case that the match value is greater than a threshold; and
   determining, according to the corresponding foreground target region corresponding to the counterweight block, the center position of the counterweight block, and the relative orientation between the mounting hole in the counterweight block and the positioning pin.

4. The crane counterweight block alignment detection and control method according to claim 3, wherein the determining, according to the corresponding foreground target region corresponding to the counterweight block, the center position of the counterweight block comprises:
   calculating a minimum bounding rectangle of the corresponding foreground target region, and calculating a center position of the minimum bounding rectangle to serve as the center position of the counterweight block.

5. The crane counterweight block alignment detection and control method according to claim 3, wherein
   the counterweight block is provided with at least two mounting holes for matching with at least two positioning pins on the crane;
   the detecting the relative orientation between the mounting hole in the counterweight block and the positioning pin, and calculating, according to the relative orientation, the relative rotation angle of the counterweight block comprises: detecting the positions of the at least two mounting holes and the positions of the at least two positioning pins, and calculating, according to the positions of the at least two mounting holes and the positions of the at least two positioning pins, the relative rotation angle of the counterweight block;
   the detecting the positions of the at least two mounting holes comprises: detecting a circular hole object in the corresponding foreground target region according to Hough circle transformation, and calculating the center coordinates of the circular hole object through sub-pixel-level edge fitting to serve as the positions of the at least two mounting holes.

6. The crane counterweight block alignment detection and control method according to claim 3, wherein the segmenting out one or more foreground target regions from the image comprises:
   transforming the image from a time domain space to a frequency domain space by wavelet transform for filtering and denoising processing; and
   performing one or more of the following operations on the filtered and denoised image so as to segment out one or more foreground target regions: edge detection, morphological processing, and HSV color space based color feature extraction.

7. The crane counterweight block alignment detection and control method according to claim 6, wherein the filtering and denoising processing comprises:
   determining a high-frequency part and a low-frequency part of the image in the frequency domain space;
   at the high-frequency part, multiplying a decomposition coefficient by a positive value less than 1 to weaken details when the decomposition coefficient is less than a first threshold; and
   at the low-frequency part, multiplying the decomposition coefficient by a value greater than 1 to highlight a contour when the decomposition coefficient is greater than a second threshold.

8. The crane counterweight block alignment detection and control method according to claim 1, wherein the controlling, according to the relative offset and the relative rotation angle, the movement of the counterweight block comprises:
   controlling, according to the relative offset, operation of a slewing mechanism, a luffing mechanism and/or a hoisting mechanism of the crane, so that the relative offset is located in a preset alignment error range;
   controlling an attraction part of a rotating mechanism to be lifted upward to be attracted to the bottom end of the counterweight block, and controlling, according to the relative rotation angle, the attraction part to rotate so as to drive the counterweight block to rotate; and
   controlling the attraction part to be lowered to enable the mounting hole in the counterweight block to be aligned with and installed onto the positioning pin.

9. A crane counterweight block alignment detection and control device, the counterweight block being provided with a mounting hole for matching with a positioning pin on the crane, wherein the device comprises:
- a detection device, used for detecting a center position of the counterweight block, and a relative orientation between the mounting hole in the counterweight block and the positioning pin; and
- a control device, used for performing the following operations:
  - calculating, according to the center position of the counterweight block and the position of the positioning pin, a relative offset between the center position of the counterweight block and the position of the positioning pin;
  - calculating, according to the relative orientation, a relative rotation angle of the counterweight block for aligning the mounting hole with the positioning pin; and
  - controlling, according to the relative offset and the relative rotation angle, the movement of the counterweight block to enable the mounting hole in the counterweight block to be aligned with and installed onto the positioning pin.

10. The crane counterweight block alignment detection and control device according to claim 9, wherein
the counterweight block is provided with at least two mounting holes for matching with at least two positioning pins on the crane;
the position of the positioning pin is a center position between the at least two positioning pins;
the detecting the relative orientation between the mounting hole in the counterweight block and the positioning pin, and calculating, according to the relative orientation, the relative rotation angle of the counterweight block comprises: detecting the positions of the at least two mounting holes and the positions of the at least two positioning pins, and calculating, according to the positions of the at least two mounting holes and the positions of the at least two positioning pins, the relative rotation angle of the counterweight block.

11. The crane counterweight block alignment detection and control device according to claim 9, wherein the detecting the center position of the counterweight block and the detecting the relative orientation between the mounting hole in the counterweight block and the positioning pin comprises:
- acquiring an image of the counterweight block, and segmenting out one or more foreground target regions from the image;
- extracting edge features of the one or more foreground target regions;
- matching the edge feature of each foreground target region of the extracted one or more foreground target regions with an edge feature related to the counterweight block in a pre-established standard model library, and calculating a match value;
- determining that the corresponding foreground target region corresponds to the counterweight block in a case that the match value is greater than a threshold; and
- determining, according to the corresponding foreground target region corresponding to the counterweight block, the center position of the counterweight block, and the relative orientation between the mounting hole in the counterweight block and the positioning pin.

12. The crane counterweight block alignment detection and control device according to claim 11, wherein the determining, according to the corresponding foreground target region corresponding to the counterweight block, the center position of the counterweight block comprises:
calculating a minimum bounding rectangle of the corresponding foreground target region, and calculating a center position of the minimum bounding rectangle to serve as the center position of the counterweight block.

13. The crane counterweight block alignment detection and control device according to claim 11, wherein
the counterweight block is provided with at least two mounting holes for matching with at least two positioning pins on the crane;
the detecting the relative orientation between the mounting hole in the counterweight block and the positioning pin, and calculating, according to the relative orientation, the relative rotation angle of the counterweight block comprises: detecting the positions of the at least two mounting holes and the positions of the at least two positioning pins, and calculating, according to the positions of the at least two mounting holes and the positions of the at least two positioning pins, the relative rotation angle of the counterweight block;
the detecting the positions of the at least two mounting holes comprises: detecting a circular hole object in the corresponding foreground target region according to Hough circle transformation, and calculating the center coordinates of the circular hole object through sub-pixel-level edge fitting to serve as the positions of the at least two mounting holes.

14. The crane counterweight block alignment detection and control device according to claim 11, wherein segmenting out one or more foreground target regions from the image comprises:
- transforming the image from a time domain space to a frequency domain space by wavelet transform for filtering and denoising processing; and
- performing one or more of the following operations on the filtered and denoised image so as to segment out one or more foreground target regions: edge detection, morphological processing, and HSV color space based color feature extraction.

15. The crane counterweight block alignment detection and control device according to claim 14, wherein the filtering and denoising processing comprises:
- determining a high-frequency part and a low-frequency part of the image in the frequency domain space;
- at the high-frequency part, multiplying a decomposition coefficient by a positive value less than 1 to weaken details when the decomposition coefficient is less than a first threshold; and
- at the low-frequency part, multiplying the decomposition coefficient by a value greater than 1 to highlight a contour when the decomposition coefficient is greater than a second threshold.

16. The crane counterweight block alignment detection and control device according to claim 9, wherein controlling, according to the relative offset and the relative rotation angle, the movement of the counterweight block comprises:
- controlling, according to the relative offset, operation of a slewing mechanism, a luffing mechanism and/or a hoisting mechanism of the crane, so that the relative offset is located in a preset alignment error range;
- controlling an attraction part of a rotating mechanism to be lifted upward to be attracted to the bottom end of the counterweight block, and controlling, according to the relative rotation angle, the attraction part to rotate so as to drive the counterweight block to rotate; and
- controlling the attraction part to be lowered to enable the mounting hole in the counterweight block to be aligned with and installed onto the positioning pin.

17. The crane counterweight block alignment detection and control device according to claim 16, further comprising the rotating mechanism, wherein the rotating mechanism comprises:
- the attraction part, used for attracting the counterweight block;
- a telescoping part, used for driving the attraction part to extend and retract; and
- a slewing part, used for driving the attraction part to rotate.

18. A crane, comprising the crane counterweight block alignment detection and control device according to claim 9.

* * * * *